US008781493B2

(12) United States Patent
Mahalingam

(10) Patent No.: US 8,781,493 B2
(45) Date of Patent: Jul. 15, 2014

(54) SECURITY TRACKING DEVICE

(76) Inventor: Padmanabhan Mahalingam, Madras (IN)

( * ) Notice: Subject to any disclaimer, the term of this patent is extended or adjusted under 35 U.S.C. 154(b) by 547 days.

(21) Appl. No.: 12/909,292

(22) Filed: Oct. 21, 2010

(65) Prior Publication Data
US 2011/0098058 A1 Apr. 28, 2011

Related U.S. Application Data

(60) Provisional application No. 61/253,935, filed on Oct. 22, 2009.

(51) Int. Cl.
*H04W 24/00* (2009.01)
*H04M 3/42* (2006.01)
*G08B 1/08* (2006.01)

(52) U.S. Cl.
USPC .............. 455/456.1; 455/414.1; 340/539.13

(58) Field of Classification Search
CPC .............. G06Q 10/08–10/0875; G06Q 50/28; G06Q 50/30–50/32; G06Q 30/0639; H04M 1/73
USPC ........... 370/259, 310; 455/90.1, 404.2, 414.1, 455/421, 457, 404.1, 410, 574, 403, 550.1, 455/567, 456.1–456.6; 701/32.3; 713/322; 340/539.13
See application file for complete search history.

(56) References Cited

U.S. PATENT DOCUMENTS

| | | | | |
|---|---|---|---|---|
| 5,796,338 A * | 8/1998 | Mardirossian | ................ | 340/571 |
| 6,498,565 B2 * | 12/2002 | Boulay et al. | .............. | 340/572.1 |
| 6,901,263 B2 * | 5/2005 | Gerner et al. | .............. | 455/456.1 |
| 7,738,884 B2 * | 6/2010 | Cheung et al. | ............. | 455/456.3 |
| 8,014,789 B2 * | 9/2011 | Breed | ......................... | 455/456.1 |
| 8,049,616 B2 * | 11/2011 | Hill | ......................... | 340/539.13 |
| 8,102,256 B2 * | 1/2012 | Scalisi et al. | ............ | 340/539.13 |
| 8,248,237 B2 * | 8/2012 | Fitzgerald et al. | ............ | 340/571 |
| 8,254,956 B2 * | 8/2012 | Lohi | ......................... | 455/456.1 |
| 2001/0048364 A1 * | 12/2001 | Kalthoff et al. | ............ | 340/573.1 |
| 2008/0102787 A1 * | 5/2008 | Landschaft et al. | ....... | 455/404.2 |

* cited by examiner

*Primary Examiner* — George Eng
*Assistant Examiner* — Nam Huynh
(74) *Attorney, Agent, or Firm* — Donald R. Boys; Central Coast Patent Agency, Inc.

(57) ABSTRACT

A tracking device has an on-board power source, a central processing unit, a cellular telephony transmitter and receiver, a speaker and a microphone, a bus system interconnecting electronic elements, and software or firmware executing at least periodically from a machine-readable physical medium providing a range of functions for the device. The device maintains a sleep mode until activated by an internal timing function, once activated turns on the receiver and listens for radio signals, finding particular signals, consults memory associations with one or more of those signals, and determines to activate transmission only under certain preprogrammed conditions depended on signals found and identified.

6 Claims, 4 Drawing Sheets

SECURITY TRACKING DEVICE

CROSS-REFERENCE TO RELATED DOCUMENTS

The present invention is a Non-Provisional application of U.S. Provisional application 61/253,935, filed on Oct. 22, 2009. The disclosure of priority application is incorporated herein at least by reference.

BACKGROUND OF THE INVENTION

1. Field of the Invention

The present invention relates generally to a system and method for tracking lost or stolen articles, packages and luggage, and more particularly to a device that is capable of being monitored via a cellular network to determine location.

2. Description of Related Art

Security tracking devices are common to those individuals or corporations who wish to prevent the loss or theft of any particular item of ownership that has a replacement cost that commits the notion to the owner that the article is worth tracking At the very least, this may create a great inconvenience or grievance to the owner upon the item's loss or theft. This has spurred various attempts in prior art to devise methods and devices that track or determine in real-time the location of valuable possessions or assets. Therefore, affording the opportunity to recover them upon their loss or theft, and minimizing the risk for a cost detriment, upon the article's irrecoverable status.

Existing tracking devices which employ a system of electronic receiver and transmitter components that are packaged in a housing and utilize a well known Global Positioning System (GPS), are well established in prior art. The GPS is a U.S. space-based global navigation satellite system. It provides reliable positioning, navigation, and timing service to worldwide users on a continuous basis in all weather, day and night, anywhere on or near the Earth which has an unobstructed view of four or more GPS satellites. GPS has become a mainstay of transportation systems worldwide, providing navigation and tracking for aviation, ground, and maritime operations. A problem encountered while using a system and device of this nature is that when affixed to the item that is being located or tracked, any concealment or obstruction of the satellite view to the device, nearly eliminates the device's ability to receive and transmit a signal that can be used to track or determine its location. Devices that utilize GPS are often equipped with elaborate antennae systems to overcome the problems of concealment or obstruction. Therefore, concealing the item may cause a systemic failure in locating or tracking the article or objects position to which the device has been affixed. The concealment of security tracking devices is nearly essential to eliminating the obviousness of the security tracking device being attached to an item that may be stolen. Elaborate antennae systems do not lend themselves readily to concealment, for the obvious reason that it is self-defeating to conceal them. In addition, although much effort has gone into extending the operating range for GPS and GPS-like technologies, with more and more sophisticated software implementations. GPS systems are still generally ineffective and unreliable for location tracking indoors or in other environments where obstructions to the satellite signals present challenges.

Another drawback to devices that use a GPS system for operation, are power requirements for such devices. These types of devices generally require external power to operate for long periods of time, therefore making their concealment more difficult and the reliability for their function and reporting, more questionable. Other object-tracking technologies, such as RF ID tags or bar codes, may be acceptable for tracking objects where the objects generally travel only within a small, controlled environment, such as a warehouse, where their travel paths are static and well-defined. These technologies, however, cannot suitably track the position of the object once it leaves the controlled environment.

Despite the advantages taught in prior art of security tracking devices, improvements are still being sought by the general public. The inventor of the present apparatus and method has recognized a need for advancements in prior art of security tracking devices. One embodiment of the present invention uses currently well known technologies in the art of telecommunications that utilize mobile phone tracking through the present infrastructure of the Global System for Mobile Communications (GSM). The GSM infrastructure, being one alternative system, allows for the tracking of articles or living things that contain a security tracking device, even in concealed conditions and without the requirement for unobstructed view of global positioning satellites. Furthermore, the inventor has addressed the issue of elaborate antennae systems with the primary reason being that smaller antenna may be used and discretely incorporated directly into the electronics of the device when employing the use of GSM or other mobile telecommunication protocols such as, CDMAOne, CDMA2000 or EV-DO technologies. The scope of this disclosure will not elaborate on these different types of technologies, but little effort is required to obtain more information on these systems. It should be noted that the use of multiple mobile telecommunication protocols, lends the device to more readily receive and transmit its location across a global platform.

BRIEF SUMMARY OF THE INVENTION

The inventor in the present application has considered the problems of tracking luggage, shipping containers, and other situations in which a tracking device might not have line-of-sight access to GPS satellites, and has provided a tracking device that is not subject to the limitations of GPS systems. Accordingly, in one embodiment, the inventors have provided a tracking device comprising an on-board power source, a central processing unit, a cellular telephony transmitter and receiver, a speaker and a microphone, a bus system interconnecting electronic elements, and software or firmware executing at least periodically from a machine-readable physical medium providing a range of functions for the device. The device maintains a sleep mode until activated by an internal timing function, once activated turns on the receiver and listens for radio signals, finding particular signals, consults memory associations with one or more of those signals, and determines to activate transmission only under certain pre-programmed conditions depended on signals found and identified.

In one embodiment the device identifies one or more local cellular towers, determines by stored information that the tower or towers are at or near an airfield, and returns to sleep mode accordingly without activating the transmitter. Also in one embodiment the device, with receiver activated, identifies one or more signals in a bandwidth used only at an airfield, and returns to sleep mode accordingly without activating the transmitter. In another embodiment the device may determine its local situation by tracking signal strength in receiving signals from a local cellular tower. In subsequent determination of signal strength, the device, through its onboard software, can determine whether it is approaching or moving away from the tower. It may also determine velocity by changing cell towers. Velocity may be used to determine whether the device is itself on a plane, or is being carried by a person walking.

Additionally in one embodiment the device, with the receiver activated, sensing cellular signals, determines motion of the device by changing of cellular stations. Also in one embodiment the device, in registering with the cellular service, determines its geographic location, and sends a message to a registered owner of the device, or to a service from which the registered owner may access information regarding the device. Further in one embodiment the software or firmware provides a function to activate the speaker to emit an alert signal upon a trigger signal received via the cellular receiver. The software or firmware may also provide a function to activate the speaker to emit a voice message received via the cellular transceiver, and may activate the microphone to listen for any local audio activity. The activity may be recorded locally, and may be transmitted via the cellular transceiver to a registered owner of the device or to a service from which the registered owner may access information regarding the device.

In another embodiment the device may comprise an FM receiver integrated with device electronics, such that an FM signal received triggers a response from the device via the cellular transmitter.

In another aspect of the invention a tracking system is provided, comprising a tracking device having an on-board power source, a central processing unit, a cellular telephony transmitter and receiver, a speaker and a microphone, a bus system interconnecting electronic elements, and software or firmware executing at least periodically from a machine-readable physical medium to provide a range of functions for the device, a central server in the Internet network having connection through an appropriate gateway to a cellular network having a plurality of cellular towers spread over a geographic region, and an interactive interface at the central server providing access to server functions for individuals operating Internet-connected computerized appliances. The device has an ID associated with a particular person, and is registered with the server to be tracked, and the device communicates periodically with the cellular network, providing position information for the device, and the person, through the interactive interface at the server, is enabled to access at least geographic position information for the device.

In some embodiments location and time information from successive communications with the device over the cellular network is used to determine speed and direction for the device as well as position. Also in an embodiment the server stores a history of locations, speed and direction information for devices tracked by the system, to be made available by either push or by request to persons associated with the devices. The server in many embodiments executes software from a machine-readable medium, providing functions for tracking registered devices, and organizing and storing information about the devices. One of the functions uses successive communications with a device to determine speed and direction.

In some embodiments information regarding scheduled activities of transportation companies is used in conjunction with location, speed and direction information of a device to determine probability that a device is being carried on a particular airplane or vehicle destined for a particular location. Also, determinations of likely transport conditions may be used by the system to schedule future tracking activity.

In yet another embodiment the system further comprises one or more FM transmitters in communication with the central server, wherein the central server may direct the one or more FM transmitters to signal one or more tracking devices by specific identity, and the tracking devices, if in range of the FM transmission, respond by transmission on the cellular network.

In yet another aspect of the invention a method for tracking a container is provided, comprising the steps of (a) placing in the container a device having an on-board power source, a central processing unit, a cellular telephony transmitter and receiver, a speaker and a microphone, a bus system interconnecting electronic elements, and software or firmware executing at least periodically from a machine-readable physical medium to provide a range of functions for the device; (b) communicating by the device via the cellular transmitter to a central server in the Internet network having connection through an appropriate gateway to a cellular network of a cellular provider, the network having a plurality of cell towers spread over a geographic region; and (c) determining at least location for the device by the central server through information provided by the cellular provider.

In one embodiment of the system the central server determines speed and direction for the device by using successive locations and times. Also in one embodiment the central server stores a history of locations, speed and direction information for devices tracked by the system, to be made available by either push or by request to persons associated with the devices. In some embodiments information regarding scheduled activities of transportation companies is used in conjunction with location, speed and direction information of a device to determine probability that a device is being carried on a particular airplane or vehicle destined for a particular location. Also, determinations of likely transport situation may be used by the system to schedule future tracking activity.

DETAILED DESCRIPTION OF THE INVENTION

Figure 1:
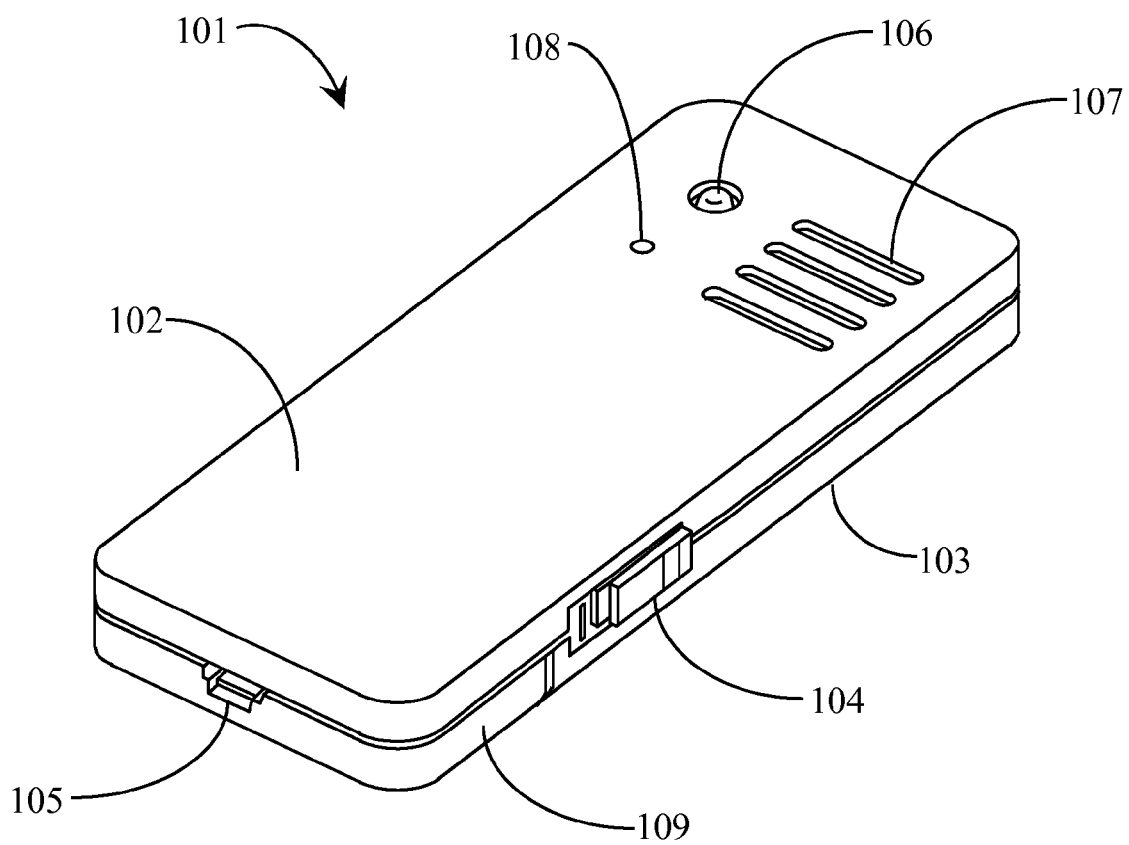
FIG. 1 is an isometric view of a security tracking device of one embodiment of the invention.

FIG. 1 of the present invention illustrates a security tracking device 101 in an isometric view. The device may be used generally to track items of value such as, briefcases, computer bags, luggage, bank bags, corporate shipping containers, pets or children, for a few examples. In one embodiment of this invention the security tracking device may be of a rectangular shape, but may also be of various other shapes or designs that render it small and compact and able to be concealed in numerous articles of transport. The security tracking device of FIG. 1 comprises several electronics components that are housed in a durable compact housing. The housing, in one embodiment of the present invention, may comprise a rear cover 103 which encompasses all of the electronics components and allows the electronic components that enable the tracking function to be rigidly mounted. The rear cover may be manufactured of a material that is light weight, durable and lends itself to low cost manufacturing methods that are well known in the art, such as plastic inject molding, or plastic vacuum forming or even thin metal stampings, for just a few examples. Various mounting features, such as screw stanchions, bosses or locking features that are common in the art may be utilized for mounting the various internal components onto the rear cover.

The security tracking device of FIG. 1 may also comprise several other housing elements, such as a battery cover 109 which allows for easy access for removal or replacement of the electrical power component of the security tracking device, and a front cover 102 element which completes the enclosure of the electronic components. These elements may be manufactured in a like manner and materials, as described above for the rear cover 103 element. In their entirety, the rear cover 103, the battery cover 109 and the front cover 102 elements, form a housing that provides shock resistance and environmental protection for the electronic devices to which they enclose.

In one embodiment of the present invention, an On/Off Switch 104 element is used to power up and power down the device. The On/Off switch may be a sliding switch type as illustrated in FIG. 1, where a sliding button is engaged onto a metal contact by sliding horizontally along the axis of a slot incorporated into a side of the enclosure, and completes a circuit which allows for electrical conductivity to pass through it. In other embodiments, this switch may be a spring loaded push in/push out type switch. The types of switches described here are well established in prior art, for enabling or disabling electrical current from a power source to the primary electrical components of an electronic device.

Also incorporated into the enclosure of the security tracking device of the present invention, is a charging port 105 element, to which a male oriented connector of a recharging device (not shown) may be inserted into a corresponding female oriented mating connector and provides for a recouping and storage of expended electrical energy of the security tracking device's power source.

Another element that may be incorporated into the front cover 102 of the security tracking device of FIG. 1 is a series of slots or in other embodiments, a circular series of holes that form a sound vent 107 element which allows sound, generated from an audio component inside the device (described later in this disclosure), to pass through and into the surrounding environment which can a alert a user to its location or, to provide a high decibel level of alarm type sounds, that may deter the theft of the article to which it is attached, or concealed within. This function mimics what is presently utilized in the prior art of vehicle alarm systems.

The front cover 102 element of the security tracking device of FIG. 1 may also incorporate several features in its design to further enhance certain functions and elements of the device. It may have an orifice in its face, such as an On/Off LED port 106 element, that allows for the possibility of a lighted indicator to protrude through its surface and indicate the status of the power condition of the device, namely power on or power off states. In one embodiment of the present invention, the front cover may also incorporate a microphone port 108 element, which comprise an orifice in its face, that allows for sound to enter into the security tracking device through the microphone port, enabling a microphone type device (further described in a subsequent paragraph) to receive sound waves.

Figure 2:
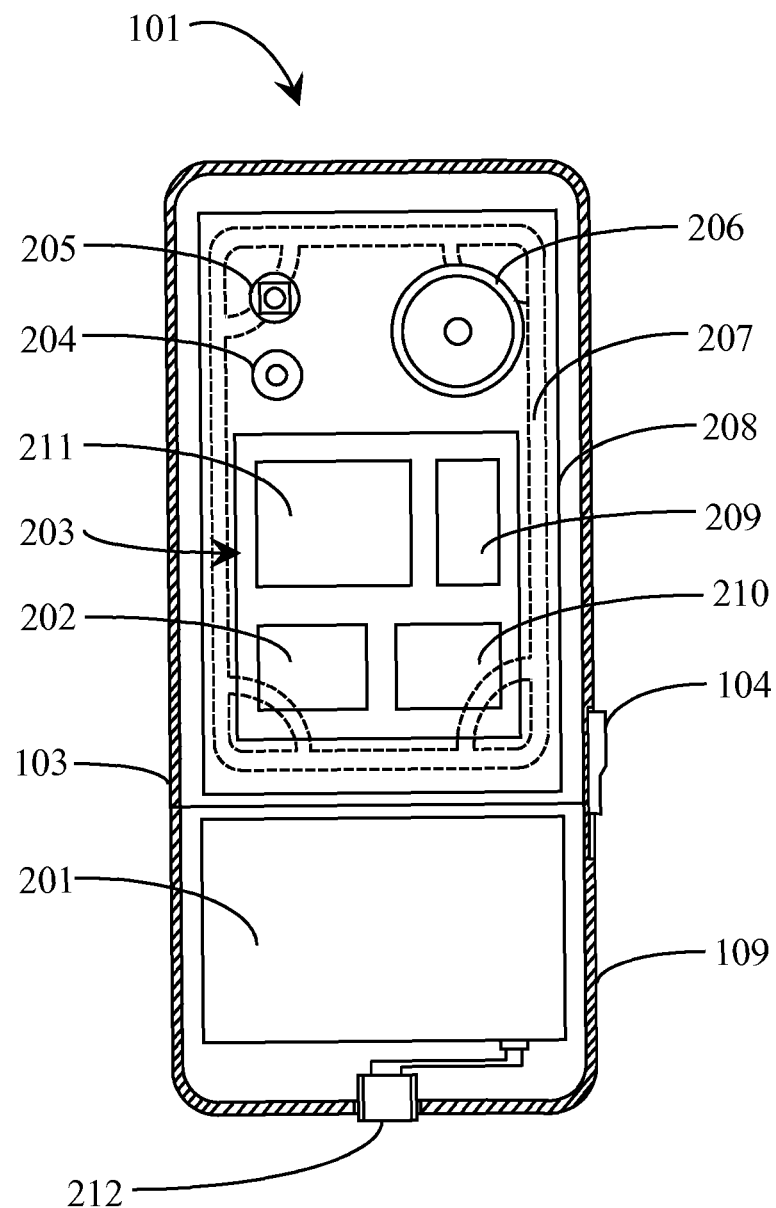
FIG. 2 is a sectioned plan view of a pictorial block diagram of the security tracking device of FIG. 1.

FIG. 2 of the security tracking device 101, is a sectioned plan view, being sectioned along a plane that is co-planar to the topmost surface of the device to better illustrate the internal components, according to one embodiment of the present invention. The enclosure elements 103 and 109 illustrate the perimeters of the enclosure which house the primary electronic components of the security tracking device.

In one embodiment of the present invention, a battery 201 element is used to provide the primary source of electrical power to the security tracking device. The battery may comprise a lithium-polymer cell technology or in other embodiments, may comprise a number of alternative battery technologies well known in prior art, such as dry cell batteries, which can be grouped together in series or parallel circuits to provide a predetermined level of voltage sufficient to power a device of this nature, for an appropriate amount of time. In one embodiment, the battery may comprise positive and negative lead outputs which may be suitably routed to the inputs of a power connector, located on the main system board 208 element. The leads thus, provide a primary connection component for the electrical requirements of the main system board. The battery may be re-energized by the use of a battery charging component (not shown) through a battery charging receptacle 212 element, located in close proximity to the battery bay of the device and protrudes into the charging port 105 element of the enclosure.

It should be noted that the main system board may comprise a host of electrical printed circuits (not shown) and micro or surface mounted electronic devices that facilitate the proper functioning of such devices, as may be necessary. The proper functions of the devices, the necessary circuit voltage and component ratings that may be required are well established to those artisans, who practice the discipline of microelectronics.

In one embodiment of the present invention, the utilization of the superior reception and transmission of cellular network radio transmission signals and their nearly global infrastructure and availability, lends the inventor to utilize this technology as the primary mode of communication for the security tracking device. To facilitate the use of this technology, chipsets of the various forms of cellular communication, that are widely known to the art, may be incorporated onto an application-specific integrated circuit (ASIC) module 203 which is furthermore incorporated, directly onto the main system board and may contain a various combination cellular communication standard chipsets, such as a Global System for Mobile Communications (GSM) transceiver 202 chip and a Code division multiple access (CDMA) transceiver 210 chip. An application-specific integrated circuit (ASIC) is an integrated circuit (IC) customized for a particular use, rather than intended for general-purpose use. For example, a chipset designed solely to run a cell phone is an example of a modern ASIC design and are well known to the art. As feature sizes have shrunk and design tools improved over the years, the maximum complexity (and hence functionality) possible in an ASIC has grown from 5,000 gates to over 100 million. Modern ASICs often include a 32-bit central processor unit (CPU) 211, a memory system 209 which may include ROM, RAM, EEPROM, flash and other large capacity memory building blocks, are also well known to the art. Such an ASIC is often termed in the art as a system-on-a-chip (SoC). In other embodiments of the present invention, the CPU, Memory system, GSM and CDMA chips may be more generally integrated onto the main system board's circuitry.

Other components of the security tracking device of FIG. 2 are subsequently described in general, for their form and functionality concerning one embodiment of the present invention. Such components may include, but not be limited to, a microphone system 204 element which may be used to listen to ambient or surrounding noise, that can indicate the environment in which the device resides at the moment. The microphone system may be remotely triggered to an on or off state by the user, which then transmits the voice or sound data to the appropriate component of the main board, is processed and transmitted through the GSM or CDMA transceivers chips as cellular radio signal.

In FIG. 2 an LED (light-emitting diode) indicator 205 is illustrated. The LED indicator may be of a singular color, or in other embodiments of the device, it may be multi-colored. Each color of the LED indicator may be programmed into the device to indicate different states of the battery power or other functions of the device. For instance, a green color may indicate the device has been powered-up, where a red color may indicate a loss of cellular radio signal and furthermore, the color amber, which may indicate that the device is in a wait or quiescent state. Other embodiments of the security tracking device may not utilize an LED indicator at all, but may rely on beep codes indicating its condition. The beep codes being transmitted through a speaker system 206. The speaker system of the present invention, may be utilized to electrically transmit sounds that perform several functions of the security tracking device, namely beep codes, that may indicate errors in processing data, power On/Off states or alarm signals that can deter the theft of the article to which the device is attached or concealed within. The alarm function may be remotely triggered by the user, upon input from the listening of the sounds transmitted through the device's microphone system 204 element. This feature of the security tracking device can aid the user in determining the environment the device may be in that moment, or allow steps to be taken which may prevent the possibility of a criminal act and aid in the recovery of the item, or prosecution of the criminals perpetrating the act.

The security tracking device of FIG. 2 also illustrates in one embodiment of the present invention, a common component to wireless device technology, namely an onboard antenna 207 element. The onboard antenna for the security tracking device is discretely integrated onto the underside of the main system board 208 and is sized appropriately to cover the perimeter of the main system board to its outer edges. It may comprise a material common to antenna manufacture, namely copper. Copper, being the best and most cost effective solution for antenna material, and is well suited to transduce electromagnetic waves to electrical current and transmit this current to the onboard GSM and CDMA transceiver inputs. The onboard antenna may be manufactured in several forms that are well known to an artisan who is skilled in the art of wireless electronics and the design of such antenna, affording it the best possible design for signal reception.

Figure 3:
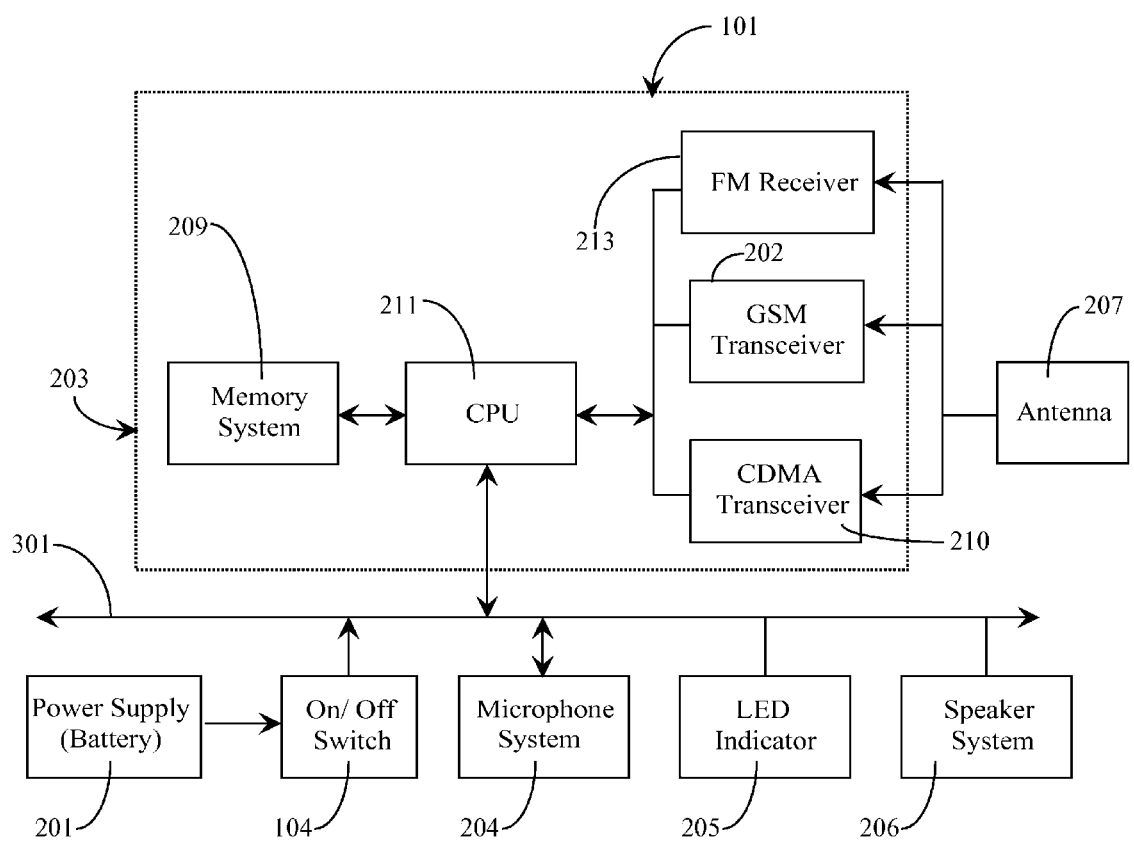
FIG. 3 is a block diagram of the security tracking device of FIG. 1, according to one embodiment of the invention.

FIG. 3 is a block diagram of the electrical components that make up the security tracking device 101 in one embodiment, according to one embodiment of the present invention. An electrical component main system board 208 may comprise several micro-electronics devices, interconnected through electrical conduits referred to as traces or printed circuits, of which the methods and technology are well established in prior art. The interconnection configuration, according to one embodiment, may comprise an electrical bus 301 which interconnects its path to those devices on the main system board which require power for their operation. Furthermore, secondary traces may provide input or output signals that operate other device functions of the system, according to a predetermined set of logic established by programs (not shown) incorporated into the chipsets. The battery element 201, being principal to the device for providing electrical power is isolated by On/Off switch 104. Upon operation of this switch, an electrical path is enabled and the main system board and its components are energized therefore, providing the necessary power to the device for normal operation.

The onboard antenna element 207, receiving electromagnetic waves from its surroundings, transmits those waves in the form of electrical signals to the ASIC 203 module where the GSM transceiver 202 and the CDMA transceiver 210 reside. The signals are interpreted and passed to the CPU 211 element which may also reside on the ASIC module. The CPU, utilizing predetermined instruction sets of a resident or transient program, may perform further processing. Based on the results of this processing, other functions may be triggered. The CPU may transmit signals to the speaker system 206 to reverberate sounds for an alarm function. The CPU may pass data signals to the memory system 209 also resident on the ASIC module, according to one embodiment of the invention, to which the memory system may perform data repository and lookup functions for the programs resident in the CPU. The CPU may also transmit power signals to the LED indicator, according to the status of power or mode of operation predetermined in a resident program. A single color may be indicated, or in other embodiments, multi-colored states may be indicated to better allow the user to determine the status of the security tracking device.

In one embodiment an FM receiver 213 is provided with communication functionality to the CPU, and functions in this embodiment are further described below.

Figure 4:
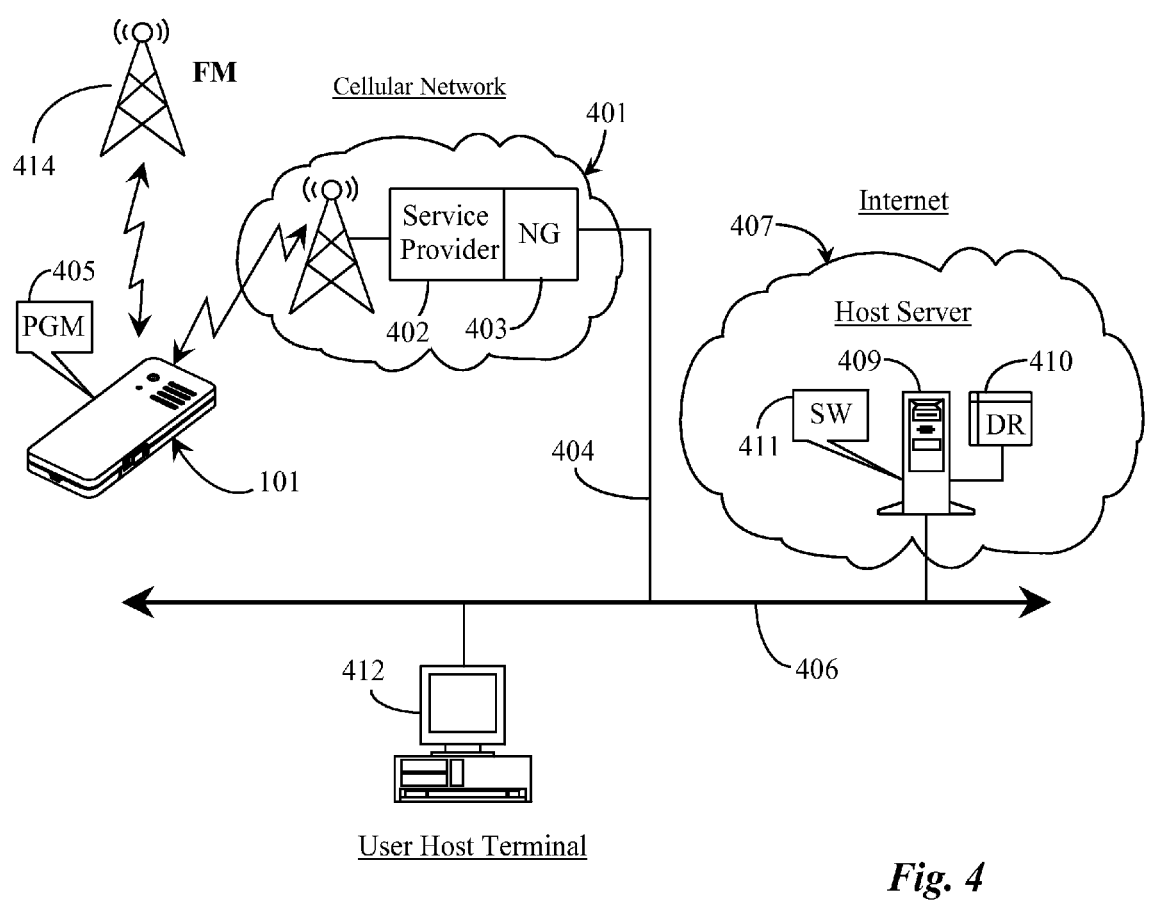
FIG. 4 is an architectural diagram of the security tracking device of FIG. 1 and the system to communicate with the device, according to one embodiment of the present invention.

FIG. 4 is an architectural diagram for the security tracking device 101 and its operations and communications systems, according to one embodiment of the invention.

As stated previously, the inventor of the present disclosure has recognized a clear need in the art for a security tracking device that operates within the well known communication sector of the cellular network 401 infrastructure. The inventor has determined a clear advantage of cellular communications to concealed wireless devices, as opposed to the requirements for the line-of-sight GPS communications infrastructure, which does not lend itself easily to concealing the wireless device.

In one embodiment the tracking device 101, by virtue of on-board software or firmware, indicated in FIG. 4 as program (PGM) 405, may communicate directly to a device operated by a registered owner of the tracking device. For example, device 101 might, at appropriate times, send SMS messages, or other messages, directly to the cellular device operated by the owner, or may communicate through a gateway to place a call to a PSTN device operated by or associated with the owner.

In another embodiment the cellular network infrastructure may comprise an internet service provider (ISP) 402 subnet and associated network gateway (NG) 403 which receives and relays transmissions from security devices, through an intermediary internet access line 404. The structure, components and operations of the cellular network system and infrastructure, are well established in prior art. The transmissions occurring along the intermediary internet access line are then subsequently relayed through an internet system backbone 406 to an Internet host 409 that resides within the Internet 407 infrastructure. The structure, components and operations of the ISP system and infrastructure are also well established in prior art. These two infrastructures, acting in accord with one another, provide the primary means for communication between the security tracking device 101, the user host terminal 412 and the Internet host 409, according to one embodiment of the present invention.

The user host terminal 412 in this embodiment, allows the user a visual means, such as an interactive graphical user interface (GUI), to track and interact with the device through an Internet host 409. Specialized software program 411 which resides on the Internet host, allows the user to interact with software/firmware 405 that may be resident in the security tracking device, for specific functions of the device, according to one embodiment of the present invention. It should be noted that multiple devices may be deployed and tracked by the user, utilizing unique identification numbers (UIN). The UIN, such as may be afforded with an International Mobile Equipment Identity (IMEI) or Subscriber Identity Module (SIM), of the cellular network industry, are maintained in the software/firmware of the security tracking device and registered, in a look-up-table form, or other means, of a data repository 410 residing in the Internet host server 409. This may be implemented, to further provide a means for identifying devices that are unique to the host service provider.

In one embodiment of the present invention, the operation of the security tracking device may occur as described by the following. In one example the user activates the device by manual operation of the on/off switch 104. A power-on self test (POST) of the electronics of the device replies with a pass or fail audible beep to the user, as a result. According to a predefined program instruction set, the tracking device may then ping for a reply from any nearby cellular provider's cell tower, which is in range. If a reply signal is received, the device's CPU responds with a ready state and activates the LED indicator to green, implying that the device is powered-up and receiving a location signal from a cellular network provider. A UIN specific to this tracking device and a location signal, stored in memory of the device and transmitted to the ISP by radio transmission, through the cellular cell tower and network gateway. This data is then passed through the network backbone, to be interpreted and stored in the ISP host server, where it may be retrieved from the user host terminal, as required. The user places the security tracking device into the article or container of which the tracking is desired, a personal luggage bag, for example. After the POST test, and communication with the Internet host 409 has been established, a timing sequence is initiated in the software (SW) 411 of the Internet host. An allocated amount of time shall elapse and the device will go into a quiescent state to conserve battery power. The device will periodically awake according to other predetermined instructions and ping the cellular network, for determining its location, or in other embodiments, the software of the Internet host may ping the device to wake it up, and force a query for the device's location, after an elapsed period of time. This allows for a bi-directional communication operation gateway to exist between the device and the Internet host. It may also be enabled for the user to initiate an unscheduled location query of one or more devices through the ISP, to determine the whereabouts of any one of several devices that are being tracked, through interaction with an internet browser and the Internet host.

The location signal transmitted to the device, being determined by the cellular provider, is passed to the ISP and retrieved downstream by the user, interfacing with the ISP provider's SW 411. This allows for real time tracking as the security device passes from one cellular cell tower zone, to another. The UIN and the time-stamp provided by the location signal received from each ping reply from a cellular cell tower, provides an opportunity to deduce several types of information. One being, by algorithms built into a SW 411 of the Internet host server, the location of the device can be determined. Other algorithms may tell a user, the mode of travel the device may be undertaking, at that time. This may generally be derived by, the last known location and present location ratio of distance between points and elapsed time, equated to be the rate of travel. If the rate is determined to be, for example 30-60 mph, it may well be presumed to be traveling by vehicle. If the rate of displacement calculation returns a value of 300-600 mph, it may well be presumed that the mode of travel is by aircraft. Also, an example of a calculation that returns a value of 0-3 mph may indicate the method of travel to be a walking person or, in the case of zero mph for a prolonged period of time, the security device can be presumed stationary. In addition to knowing the rate of travel, the direction of travel may also be deduced, as the device is discovered from multiple pings and passes from one cell tower zone to another. This direction vector may then be further processed by the host SW 411 and made accessible to the user. The user may then determine if their luggage, in this example, is on a destination path that coincides with their destination, or in fact, may be going to an entirely different destination. Preventive measures may then be taken by the owner, to minimize the distance the luggage may travel off course.

Another example for the use of this system and device is in the tracking of shipping containers. A corporation may place a device into several containers and track their location, as noted above. Containers that possess an onboard device may take several forms of transportation, in the journey to their destination. They may start their journey at the manufacturer, of which has purchased the devices and service with an internet provider, and subsequently being activated and verified by the host service provider, placed in containers with the manufacturers product. The container may then be transported over land towards a shipping port. The container, being tracked to this location by means of the cellular network 401 and the Internet host 409, can report location and status through the common ISP network link to comptroller personnel, who are responsible for the reporting action and knowledge of location and status of their product. The report may be sent utilizing various communication protocols to the internet and cellular networks, such as SMS (Short Message Service), email service or other protocols, well known to the art. The container may sit in a static condition for a prolonged period before being loaded onto a container vessel to be transported by waterway. During this period, the number of automated pings to the system could be reduced by a predetermined instruction set in SW 411, to reduce battery consumption even further. After being loaded to the container vessel, and as the vessel comes into range of cellular cell towers located throughout the oceans of the world, an update to the internet host may be transmitted. The updated location information can be transmitted to the user by means mentioned previously, or the user may interact with the service provider through a host terminal for updating their own data repositories, with automated downloads to an always live server, according to one embodiment of the present invention.

Deductions referred to above are actually SW decisions made based on pre-programmed assumptions, and there are wide variety of different sorts of deductions that may be made. For example, if the system determines, from successive communications with a device that the device was last know to be traveling at 500 mph, heading due west, a few miles off the coast of California near Los Angeles, and the device no longer responds, the SW may logically infer that the container which carries the device is on an airplane traveling overseas toward either Hawaii, the South Sea Islands, or other destination in the Pacific rim.

Under this circumstance the system may have decision paths for setting up a search pattern for the device based on logical estimates. The system may, after a suitable delay of perhaps two hours, begin to ping for the device from Honolulu. If that fails over a suitable period of time, the system may later begin to ping from Hong Kong or Japan, for example.

The system may also have airline schedules accessible for processing, and, based on the last known position and velocity for the device, may match that with an airline and a particular flight, and thereby deduce the probable destination for the device, and then set up to ping at the expected arrival time for that flight at its published destination.

Other operations may be performed with various signals and program processes through the component interconnects, such as a remote signal from the user, through the host system, to activate the speaker system 206 to initiate an alarm. Other signals that may be processed and transmitted by the CPU to an element of the device, and are remotely generated from the user, through the ISP server SW 411. The user may initiate a signal to the listening capability of the onboard microphone system 204 using any one form of internet browser and the Internet host 409. The CPU 211 may process the data from the microphone system 204 and convert it to sound formatted packets that are transmitted back to the user, through the cellular provider, and the ISP, where it may be digitally recorded and stored to the data repository (DR) 410 and later retrieved from the Internet host by the user at the user host terminal 412, or be pushed by the host to the user on some agreed-to schedule.

In another alternative embodiment FM radio may be incorporated into the system for expanded functionality. FIG. 3 illustrates an FM receiver 213 in a device according to an embodiment of the invention, and FIG. 4 illustrates an FM transmitter 414, which is intended to represent an FM station which may have several functions.

In one embodiment of a tracking system FM transmitters might be implemented at certain public airfields. In such an embodiment, in concert with machine intelligence at host server 409, FM alerts may be issued by transmitters 414, keyed to certain tracker ID, so trackers may be momentarily awakened on a programmed basis, if the tracker happens to be in the FM range of the transmitter at a particular airfield. This is useful in a number of ways for controlling tracker devices on aircraft, in luggage compartments, and in luggage claim areas, for purposes, for example, of soliciting location and other information from the devices. As an example, the Host 409 might cooperate with an FM transmitter at LA International to seek presence of a particular device having a particular ID. If the device is at LA International, and receives the FM "ping", the device may be programmed to respond via the cellular network, either to the owner, or to the host 409.

An important feature of the invention in certain embodiments is that the cellular receiver and the cellular transmitter may be controlled separately, and that with the receiver activated the unit may perform certain logic. It is important, for example, that cellular transmission be suppressed at and perhaps in the immediate vicinity of airfields, in particular in aircraft during approach, landing and takeoff runs. One way that a device according to the instant invention may discern its location at an airfield is to determine the identity of the closest cell tower in one or more networks. The device may have a table, or other organization of information, stored on-board, that relates cell tower IDs to airfields. Once the device awakes and determines the ID of the local cell tower, it may access the stored information (table perhaps) and discover whether it is itself (the device) currently in the immediate vicinity of an airfield. It may use this information with executable logic to return to a sleep mode until a future time, when the checking may be done again. It is also known that communication is accomplished in and around airfields for specialized purposes at certain frequency bands. The device may sense in the receiver mode for communication in one or another of these restricted bands, and determine thereby that it (the device) is at an airfield. There are a variety of ways the device may determine that it is no longer at an airfield, and that it is now OK to transmit. One way is by discovering that the closest cell tower is not near an airfield; also by absence of specialized frequency bandwidth communication, used at airfields. Another is by sequential sensing, determining that it (the device) is rapidly transitioning from one to another and another cell tower, and is therefore moving rapidly.

In another aspect the device may determine its local situation by tracking signal strength in receiving signals from a local cellular tower. In subsequent determination of signal strength, the device, through its onboard software, can determine whether it is approaching or moving away from the tower. It may also determine velocity by changing cell towers. Velocity may be used to determine whether the device is itself on a plane, or is being carried by a person walking Also in another aspect special transmission towers may provide short-range signals, either AM or FM, into specific areas at an airfield to indicate to devices enabled to receive these signals, that it is either permitted or restricted to transmit in the area. The presence or absence of such signals, which would be identifiable by the device from pre-programmed information, would be used by the device to transmit, or not. In the instance of non-transmission, the device will typically wake up again at pre-programmed time periods, to sense for signals and make appropriate decisions and take appropriate actions.

It will be apparent to the skilled artisan that there are many ways the embodiments described in this specification may be altered without departing from the spirit and scope of the invention. There are, for example many different sizes and thicknesses in which the security tracking device may be accommodated to. There are various methods of developing software and firmware to accommodate the function and device combinations to which the security tracking device may contain. Different applications for which the security tracking device may be utilized will be apparent to the skilled artisan, according to other embodiments of the present invention. There are many such alterations that may be made without departing from the spirit and scope of the invention.

The invention claimed is:

1. A tracking system comprising:
a tracking device having an on-board power source, a central processing unit, a cellular telephony transmitter and receiver, a speaker and a microphone, a bus system interconnecting electronic elements, and software or firmware executing at least periodically from a machine-readable physical medium to provide a range of functions for the device;
a central server in the Internet network having connection through an appropriate gateway to a cellular network having a plurality of cell towers spread over a geographic region; and
an interactive interface at the central server providing access to server functions for individuals operating Internet-connected computerized appliances including at least device tracking activity;
wherein the device has an ID associated with a particular person, the ID is registered with the server, and the device communicates periodically with the cellular network, providing information including at least location and time for the device, and the server is enabled to gather information of scheduled activities of transportation companies and determine at least geographic position, acceleration, speed and direction information for the device by using successive locations and times received via at least a portion of the plurality of cell towers, all information used by the server to determine a type of vehicle carrying the device, probable destination for the device and schedules future tracking activity for the device based on the determination, making the tracking activity and the information accessible via the interactive interface for the particular person with the associated ID.

2. The system of claim 1 wherein the server stores a history of locations, speed and direction information for devices tracked by the system, to be made available by either push or by request to persons having an ID associated with the devices.

3. The system of claim 1 wherein the server executes software from a machine-readable medium, providing further functions for tracking registered devices, and organizing and storing information about the devices.

4. The system of claim 1 further comprising one or more FM transmitters in communication with the central server, wherein the central server may direct the one or more FM transmitters to signal one or more tracking devices by specific identity, and the tracking devices, if in range of the FM transmission, respond by transmission on the cellular network.

5. A method for tracking a container, comprising the steps of:
  (a) placing in the container a device having an on-board power source, a central processing unit, a cellular telephony transmitter and receiver, a speaker and a microphone, a bus system interconnecting electronic elements, and software or firmware executing at least periodically from a machine-readable physical medium to provide a range of functions for the device;
  (b) communicating by the device via the cellular transmitter to a central server in the Internet network having connection through an appropriate gateway to a cellular network of a cellular provider, the network having a plurality of cell towers spread over a geographic region;
  (c) determining at least real-time location, acceleration, speed and direction for the device by the central server by using successive locations and times received via the plurality of cell towers;
  (d) gathering information of scheduled activities of transportation companies by the server;
  (e) determining at least a type of vehicle carrying the container and probable destination for the device from the information gathered in steps (c) and (d) and scheduling future tracking activity for the device based on the determination; and
  (f) making the tracking activity and the information accessible via an interactive interface at the server for a particular person having an ID associated with the device.

6. The method of claim 5 wherein the central server stores a history of the locations, speed and direction information for devices tracked by the system, to be made available by either push or by request to persons having IDs associated with the devices.

* * * * *